United States Patent [19]

Sanders et al.

[11] Patent Number: 5,006,980
[45] Date of Patent: Apr. 9, 1991

[54] PIPELINED DIGITAL CPU WITH DEADLOCK RESOLUTION

[75] Inventors: Douglas E. Sanders, Framingham; George M. Uhler, Marlborough; John F. Brown, III, Northborough, all of Mass.

[73] Assignee: Digital Equipment Corporation, Maynard, Mass.

[21] Appl. No.: 222,008

[22] Filed: Jul. 20, 1988

[51] Int. Cl.⁵ .............................................. G06F 9/38
[52] U.S. Cl. ................................ 364/200; 364/231.8; 364/262.3; 364/230
[58] Field of Search ... 364/200 MS File, 900 MS File

[56] References Cited

U.S. PATENT DOCUMENTS

| | | | |
|---|---|---|---|
| 4,236,206 | 11/1980 | Strecker et al. | 364/200 |
| 4,586,130 | 4/1986 | Butts, Jr. et al. | 364/200 |
| 4,709,324 | 11/1987 | Kloker | 364/200 |
| 4,714,991 | 12/1987 | Eaton | 364/200 |
| 4,750,112 | 6/1988 | Jones et al. | 364/200 |
| 4,760,519 | 7/1988 | Papworth et al. | 364/200 |
| 4,794,527 | 12/1988 | Stewart et al. | 364/200 |
| 4,812,970 | 3/1989 | Kitamura et al. | 364/200 |

OTHER PUBLICATIONS

Mishra, "The VAX Microarchitecture", *Digital Technical Journal*, Feb. 1987, pp. 20-33.
Troiani et al, "The VAX 8600 I Box, A Pipelined Implementation of the VAX Architecture," Digital Technical Journal, Aug. 1985, pp. 24-42.

Primary Examiner—Michael R. Fleming
Assistant Examiner—Debra A. Chun
Attorney, Agent, or Firm—Arnold, White & Durkee

[57] ABSTRACT

A pipelined CPU employs separate microinstruction pipelines for the execution unit and memory management unit. Deadlocks can occur in a pipelined CPU when there is data dependency in two consecutive instructions. The later instruction may stall the pipeline if operands fetched by an earlier instruction are needed, but the earlier instruction is not producing the memory request for the operands because the pipeline is stalled; this results in a deadlock. Using separate micro-pipelines, the earlier instruction is advanced independently of the rest of the pipeline, in the case of a deadlock, so that the operands for the later instruction are provided and the deadlock is broken.

20 Claims, 10 Drawing Sheets

| | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|---|---|---|---|---|---|---|---|---|---|---|---|---|---|---|---|---|---|
| BASIC | 1 | ALU FUNCT | | | MRQ FUNCT | | | L | B | | | | | | | W | | | C | C | | MISC. | | | | A | | | | |
| CONSTANT | 0 | 0 | ALU FUNCT | | | POS | | | CONSTANT VALUE | | | | | | | | | | W | | | C | C | | MISC. | | | | A | | | | |
| SHIFT | 0 | 0 | 1 | SHIFT VAL. | | | | SHIFT FUNCT. | | | B | | | | | | | W | | | C | C | | MISC. | | | | A | | | | |
| SPECIAL | 0 | 1 | 0 | MISC. | | | | | | | B | | | | | | | W | | | C | C | | MISC. | | | | A | | | | |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| JUMP | 0 | MUX | S B | JUMP ADDRESS | | | | | | | | | | | | |
| BRANCH | 1 | MUX | S B | BRANCH COND SEL | | | | BRANCH OFFSET | | | | | | | | |

*Fig. 4*

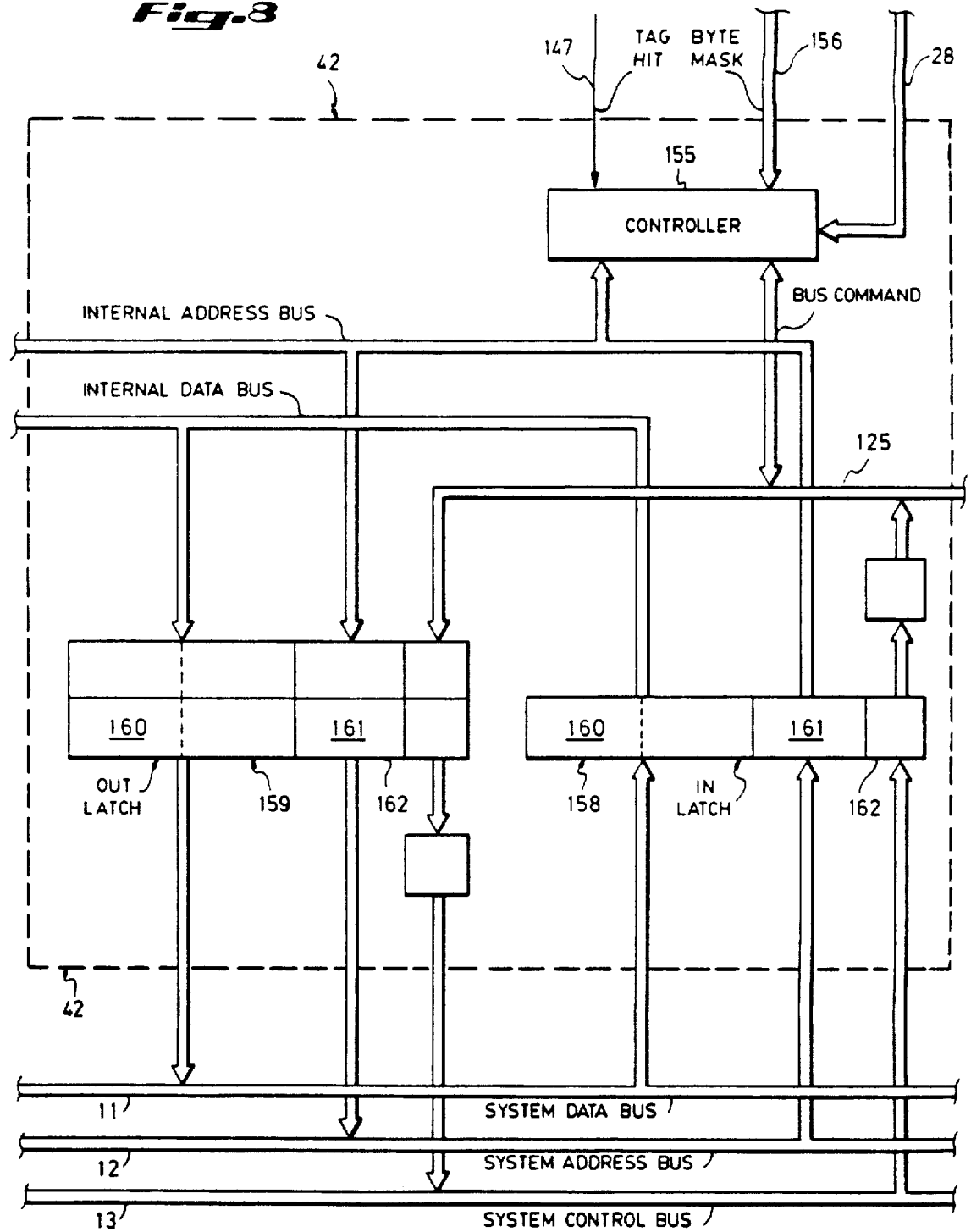

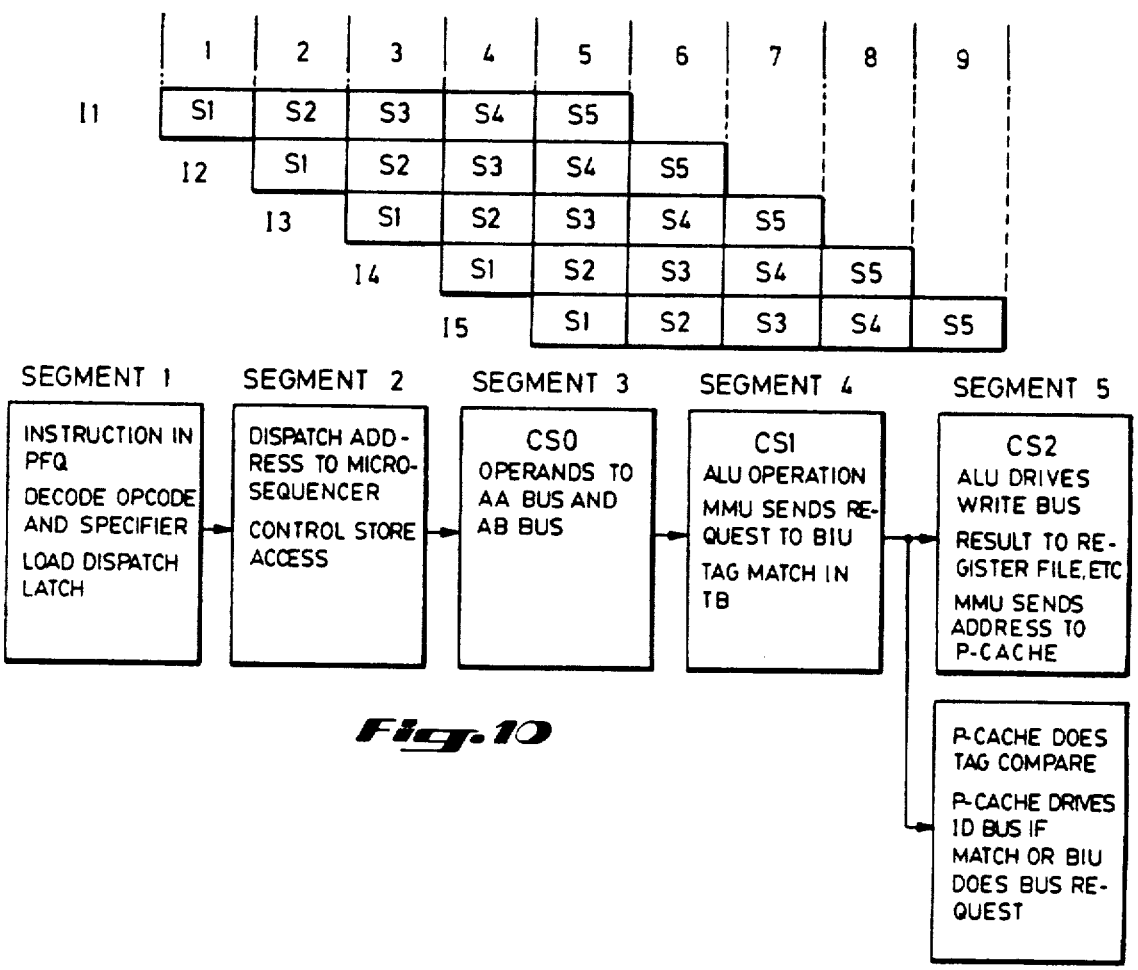
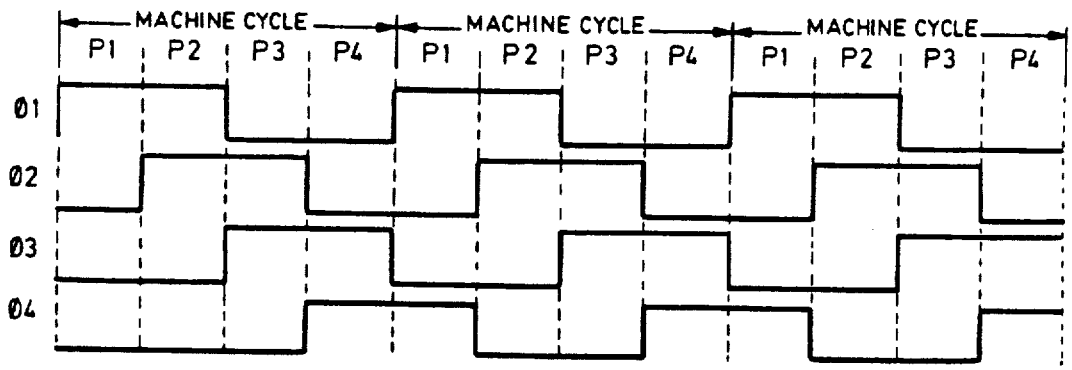

PIPELINED DIGITAL CPU WITH DEADLOCK RESOLUTION

BACKGROUND OF THE INVENTION

This invention relates to digital processors, and in particular to pipelined CPUs in digital processors.

A general purpose computer processes data by executing one or more of several predefined instructions in a particular sequence. An example of a computing machine is a hand held calculator. In this machine, the predefined instructions (the instruction set) may include only the arithmetic operations of addition, subtraction, multiplication and division. Data and the required sequence of instructions are input by the user one by one and an arithmetic calculation results.

The set of sequential instructions that a computer executes to produce a desired result is called a program. In general purpose machines with large instruction sets, the programs may be very large. Since computers execute the instructions much faster than users can input them, it is desirable to store the programs in electronic memories so that the computer can automatically read the instructions and thereby run at top speeds.

Most modern stored-program data processing systems are based on the Von Neumann model. The Von Neumann computer design is based upon three key concepts:

- Data and instructions are stored in a single read-write memory.
- The contents of this memory are addressable by location, without regard to the type of data contained in that location.
- Execution occurs in a sequential fashion (unless explicitly modified) from one instruction to the next.

The primary circuits of the Von Neumann computer can be broadly grouped into two parts: a memory and a central processing unit (CPU). The memory holds the data and the instructions for the computer system. The CPU can be considered the brain of the system. It contains electronic logic that sequentially fetches and executes the stored instructions.

Data in most digital computers is represented in the form of binary numbers. Each location in memory is capable of storing a binary number (the maximum size of which depends upon the type of computer system). The program or set of sequential instructions that the CPU executes is stored in a particular region of memory. An instruction may occupy more than one location in memory. The first part of each instruction is called an opcode. The opcode is a unique binary number that tells the CPU which instruction it is. Most instructions have other parts that may contain operands (data to be processed) or operand specifiers. Operand specifiers inform the CPU where to find the operands that the instruction requires. These operands may be anywhere in memory or in certain temporary memory locations inside the CPU.

In general, the CPU performs the following operations to execute an instruction:

1. Fetch an instruction from memory.
2. Decode the fetched instruction to interpret the instruction.
3. Fetch from memory any operands (data on which the instruction operates) required by the instruction.
4. Perform the operation defined by the instruction.
5. Store the results of the operation in memory for future reference.

Different sets of hardware (called functional units) within the CPU carry out these operations. The functional units of a CPU usually include various registers (memory elements) and an arithmetic and logic unit (ALU). The registers store temporary results and instruction operands (data on which an instruction operates). The ALU uses combinatorial logic to process the data present at its inputs. The output of the ALU depends upon the control signals provided to it, and is obtained from the input by performing an arithmetic operation or a logical (shifting or boolean) operation. The processing in the CPU is done by channeling data from operand registers through the ALU into result registers. The data may be channeled through the ALU many times for complex instructions.

Data is transferred between the basic elements of the CPU through common busses (set of wires that carry related signals). The data transfers are dependant on the type of instruction currently being executed and are initiated by a central controller. The CPU controller sends a sequence of control signals to the various registers of the CPU, telling the registers when to put data on the common read bus (going to the inputs of the ALU) and when to get data off the common write bus (coming out of the ALU). The CPU controller also tells the ALU what operation to perform on the data from the input to the output. In this way, the controller of the CPU may initiate a sequence of data transfers starting with fetching the instruction from main memory, fetching corresponding data, passing the data between the ALU and the various temporary storage registers, and finally writing processed data back to main memory.

The various implementations of a controller fall under two main categories: hardwired and microprogrammed. Hardwired controllers use combinatorial logic and some state registers to produce a sequence of control signals. These control signals depend upon the type of instruction just fetched and the result of the execution of the previous instruction. The microprogrammed controller performs the same function but uses a ROM or RAM controlled state machine to produce the control signals from previous state and instruction inputs.

Hardwired controllers are tailored for a particular instruction set, and the logic used to implement them becomes increasingly complex as the complexity of the instruction set increases. Microprogrammed controllers are more general purpose devices in that changes of the control store can be used to change the microinstruction flow without changing the hardwired logic. While the hardwired controllers are fast, microprogrammed controllers provide more flexibility and ease of implementation.

In the simplest implementation of a microprogrammed controller, each CPU instruction corresponds to a microflow stored in the control store. As used herein, a micro-flow refers to a micro-programmed subroutine. Each bit or decoded field of a microinstruction corresponds to the level of a control signal. Sequencing through a series of such microinstructions thus produces a sequence of control signals. In a microprogrammed controller, each CPU instruction invokes at least one micro-flow (which may be just one microinstruction long for small one cycle CPU instructions) to generate control signals which control ALU operations and data transfers on the CPU internal busses.

Computers are often classified into complex instruction set computers (CISCs) and reduced instruction set computers (RISCs) on the basis of the instruction sets that their CPUs support. CISCs commonly have a large instruction set with a large variety of instructions, while RISCs typically have a relatively small set of simple instructions. Since RISC CPUs have a few simple instructions, they can afford to use the fast hardwired controllers. CISC CPUs usually use microprogrammed controllers because of ease of implementation. Some CPUs may use a plurality of controllers: hardwired and microprogrammed, to control various subsections of the CPU.

Since a machine operation may depend on the completion of a previous machine operation, the functional units operate on instructions sequentially. As a result, in a simple computer design, each functional unit is only being used for a fraction of the duration of the instruction execution.

The iterative fetch and execute scheme of the Von Neumann machine has been modified in many ways to produce faster computers. One such architectural modification is a technique known as pipelining. Pipelining significantly increases CPU performance by overlapping execution of several instructions in the CPU. In a pipelined architecture, different functional units process different instructions simultaneously.

An example of a pipelined CPU is described by Sudhindra N. Mishra in "The VAX 8800 Microarchitecture," *Digital Technical Journal*, Feb. 1987, pp. 20-33.

Pipeline processing is like an assembly line where assembly of many items happens simultaneously, but at any time each item is at a different stage of the assembly process. Pipelining allows overlapped execution of several instructions, thereby increasing the effective execution speed (or throughput) of each instruction.

Since each functional unit can handle only one instruction at a time, it is necessary that all functional units advance the instructions that they are processing in a synchronized manner. Unlike the assembly line analogy, however, functional units in a pipelined computer may require variable amounts of time depending upon the instruction they are processing. If one of the functional units takes a long time to perform its function on a particular instruction, all the functional units that follow in the pipeline must wait for it to finish before they can advance their respective instructions. This results in a pipeline stall. Pipeline stalls can also occur if a particular instruction needs the results of the previous instruction. The instruction that needs the results may stall the pipeline starting at the operand fetch unit, waiting for the previous instruction to produce the operands that the stalled instruction requires.

In known RISC systems, most instructions use the various CPU functional units for equal amounts of time. Pipelining in RISCs can thus be accomplished by overlapping the execution of CPU instructions, as described above. On the other hand, some CISC instructions can be quite complex, requiring long periods of time to execute, while other CISC instructions may be relatively simple and require much less time to execute. The disparity in functional unit usage among various CISC instructions would make the CISC pipeline stall often and for relatively long periods of time. For this reason, the pipelining of CISC CPU instructions is more difficult.

Various CISC instructions may have different sizes of microflows. Since each microinstruction provides control signals for one cycle to all elements of the various functional units, in some CISC machines the microinstructions are pipelined instead of the CPU instructions (as commonly done in RISC machines). This reduces stalling because the time of execution of each microinstruction is the same. In a microinstruction pipeline, each stage uses a few bits in the microinstruction that correspond to the functional unit of that stage. After each functional unit has made use of the microinstruction that controlled its activity during a cycle, it passes this microinstruction to the next functional unit in the pipeline in the next cycle. The first functional unit gets a new microinstruction. In this way, the fundamental principle of pipelining—overlapped instruction execution to utilize various functional units in parallel—is realized.

A basic rule governing control of most pipelined processors is that all functional stages of the pipeline simultaneously advance their states to the next functional stage. This is the conventional pipeline advancement technique in which all stages advance or stall in lockstep. This is necessary because each functional unit transmits its processed state to the following unit while it receives a new state from the preceding unit.

In an optimal pipeline, a new instruction enters each functional unit of the pipeline every cycle. In order to sustain this rate and prevent pipeline stalls, the instructions must be free of dependencies. A dependency occurs when one instruction requires data or resources that are only available after the execution of a previous instruction, and the data or resources are not yet available. When the operands or resources become available, the dependency is resolved, the stall condition is removed, and the pipeline is allowed to advance.

In many systems, three consecutive stages of the CPU instruction pipeline or micropipeline are devoted to:

Accessing operands

Calculating addresses or performing operations on operands

Issuing memory reads of addresses just calculated, or storing in memory results just produced in the previous segment.

In such machines, dependencies may not only create stalls but also cause deadlocks. A deadlock is a state when the pipeline freezes and can advance no more.

Memory data may be processed by first reading the data from memory into the CPU registers, and then using a second instruction some time later to access the data in the CPU registers. If the first instruction that fetches operands and the second instruction that uses them are consecutive, a deadlock state results. As the first instruction is in the second pipeline stage (of the three stages mentioned above) where the addresses of the operands in memory are being calculated, the second instruction is in the first stage trying to access the operands. A request has not yet been made to the memory for the operands because this happens in the third stage. Since the operands are not yet available, the first stage stalls the pipeline to give each stage of the pipeline enough time to perform its function. The stall prevents the pipeline from moving and the first instruction gets stuck in the second stage and does not advance to the third stage. Thus the operands never arrive and the second instruction, in the first stage, continues to stall the pipeline. This results in a deadlock.

There are a number of ways to solve the deadlock problem. The first solution is to avoid the problem by requiring that there be at least one instruction between a memory read and the instruction that accesses the data. This is not practical since unprivileged users, who can be either inexperienced or malicious, may create instruction streams that can cause a deadlock in the machine.

In certain pipeline designs, an instruction is never injected into the pipeline unless it will complete without stalling. Such pipelines are commonly referred to as issue-oriented pipelines. In this type of pipeline, the hardware detects the conflict between first and second instructions, and does not allow the second instruction to enter the pipeline until the memory reference in the first one is started.

This invention is another more efficient solution to the pipeline deadlock problem.

SUMMARY OF THE INVENTION

This invention solves the deadlock problem by breaking up some consecutive stages of a pipeline where a deadlock may occur into two parallel pipelines capable of advancing their data independently. This allows the earlier instruction to go ahead and fetch operands needed by a later instruction, while the later instructions stalls. Since the deadlock occurs due to an instruction that operates on the data that the previous instruction is fetching from the memory, the two branches of the pipeline are an execution unit control pipeline and a memory request pipeline.

The execution unit part of the pipeline controls register accesses and calculations on operands in the CPU. The memory request pipeline controls address calculation and operand fetching from memory. These parallel pipelines run in lock-step, each executing the same instruction in each segment of the pipeline that they are part of, until a deadlock occurs.

Whenever a stall occurs and a deadlock due to data dependency in consecutive instructions is detected, the earlier instruction is allowed to move forward in the memory request pipeline, while the later instruction stalls.

The earlier instruction is thus able to produce the operands required by the second instruction. No-ops (no operation) are inserted in the segments of the memory request pipeline that advanced their part of the instruction while the parallel execution unit control pipeline stalled. After the operands are produced, the deadlock is resolved and the two pipelines start moving in lock-step again.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 4 is a diagram of the format of microinstructions contained in the control store of FIG. 3;

FIG. 8 is an electrical diagram in block form of the bus interface unit of the CPU of FIG. 1;

FIG. 9 is a timing diagram showing events occurring in the pipelined CPU 10 of FIG. 1 in successive machine cycles;

FIG. 10 is a diagram of events vs. time showing the details of an instruction execution in the CPU of FIGS. 1-8;

FIG. 11 is a timing diagram of the four phase output clocks produced by the clock generator in the CPU of FIG. 1;

DETAILED DESCRIPTION OF A PREFERRED EMBODIMENT

Figure 1:
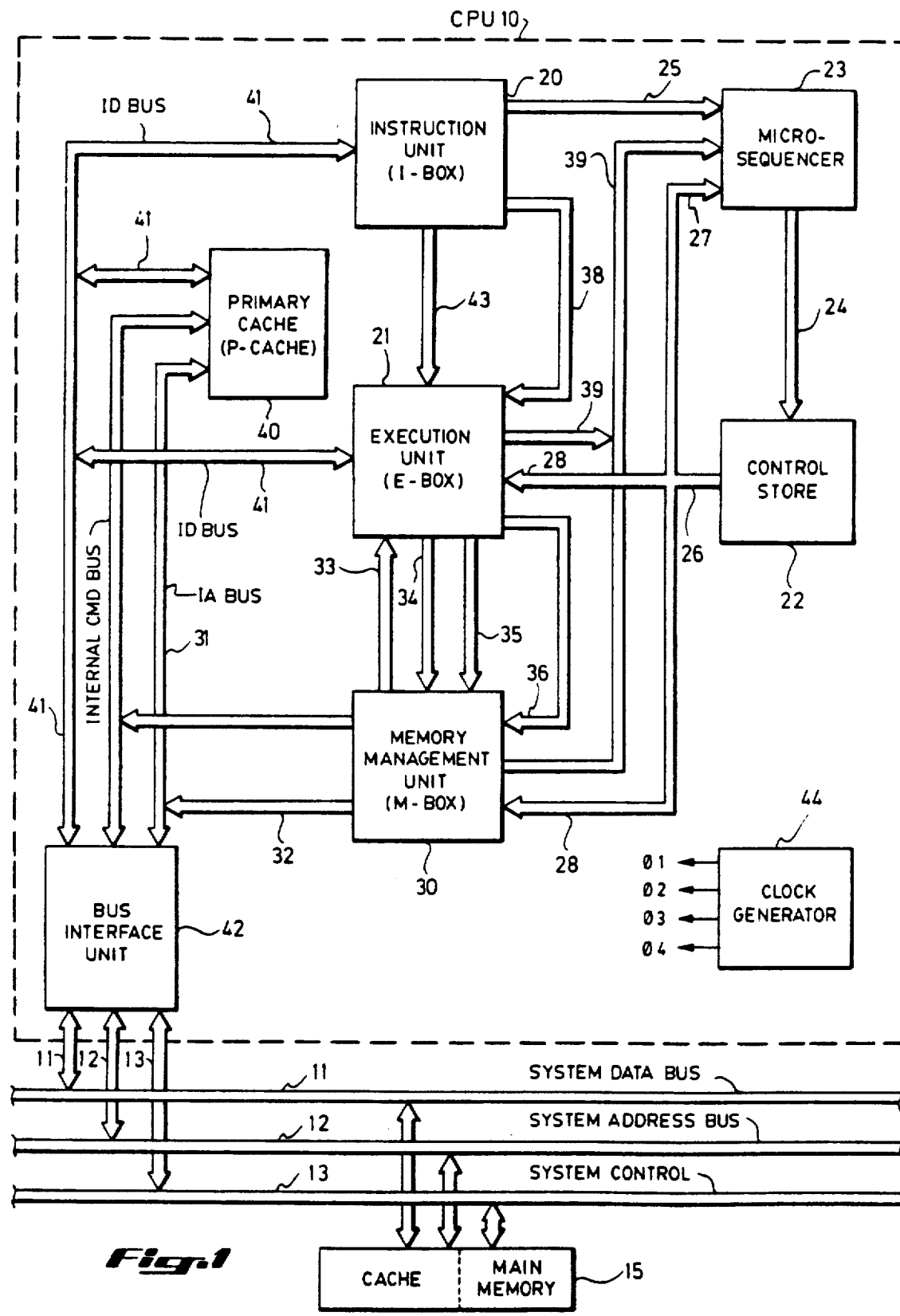
FIG. 1 is an electrical diagram in block form of a computer system including a central processing unit according to one embodiment of the invention.

The CPU:

Referring to FIG. 1, a CPU or central processing unit 10 which may use the features of the invention is illustrated. In a preferred embodiment, the CPU 10 is constructed as a single integrated circuit, but the CPU may be an integrated circuit chip set, or may be implemented with standard logic circuits or gate arrays mounted on one or more circuit boards. Although this invention is useful in any pipelined CPU, the example given here is one which executes a VAX instruction set and generally conforms to the architecture of VAX computers previously sold by the assignee. In the illustrative embodiment, the CPU 10 is connected to a system data bus 11, for example a 64-bit bidirectional bus, and to a 27-bit system address bus 12 and a system control bus 13. These busses 11, 12 and 13 are connected to system memory 15 which is not shown in detail but would usually include cache and cache controllers. The busses also access various I/O equipment.

The CPU 10, in its internal construction, includes an instruction unit 20 (referred to as the "I-Box") which functions to decode machine-level instructions for execution, along with an execution unit 21 (referred to as the "E-Box") which performs the data-manipulation part of the execution of the instruction. The CPU 10 is of the microcoded type, and employs a control store 22 which consists of a ROM (or EPROM, or the like) containing perhaps 1K or 2K words of microinstructions, with each word being fifty bits wide in this example. The control store is addressed by a microsequencer 23 which generates a series of microaddresses on an 11-bit address input 24 of the control store 22, based upon an entry point address or dispatch address received from the instruction unit 20 by an 11-bit dispatch bus 25. The output from the control store 22 is a microinstruction bus 26, 50-bits wide in this embodiment; sixteen bits of the bus 26 are connected back to an input 27 of the microsequencer 23 to provide addresses of microinstructions in a sequence following an entry point, and to provide control of the microstore addressing. The remaining thirty-four bits of the microinstruction output 26 are used as control inputs 28 to the execution unit 21 and other parts of the CPU.

The CPU 10 uses virtual addressing, and a memory management unit 30 (also referred to as the M-Box) is employed to translate a virtual address to a physical address. This unit also arbitrates instruction fetches for the instruction unit 20. The memory management unit is controlled by the 34-bit input 28 from the microinstruction bus, as well as other signals. The unit 30 is connected to a 30-bit internal address bus 31 via output 32, and is connected to the execution unit 21 by a 32-bit ALU AABus 33 for reading address registers from the memory management unit. Other connections between the memory management unit 30 and the execution unit include a 32-bit ALU output bus 34 and a 32-bit write-data bus 35; functions of these busses 33, 34 and 35 will be explained in reference to the internal construction of the execution unit 21. The unit 30 receives control bits via lines 36 from the execution unit for the purpose of defining the memory operation and word length; these control bits on lines 36 originate in the instruction unit 20 and are coupled to the execution unit 21 as part of a control bus 38. The memory management unit 30 as well as the execution unit 21 generate controls defined as microtest which are connected to an input of the microsequencer 23 via 3-bit bus 39; this is conditional data for microinstruction branching as determined by events within the execution unit 21 or memory management unit 30.

The CPU 10 includes a primary cache 40 (also called "P-Cache") which is in the example a 2K-byte high-speed RAM containing the most recently used memory data, this being either instructions or data. The cache 40 is connected to the 30-bit internal address bus 31, and to a 32-bit internal data bus 41. The internal data bus 41 also conveys instructions fetched by the memory management unit 30 for use by the instruction unit 20, and operands transferred to or from the execution unit 21.

A bus interface unit 42 controls or arbitrates the connections between the various internal busses of the CPU 10 and the system busses 11, 12 and 13, based upon an internal command bus, as well as clocks and other control bits.

Immediate (or literal) operands or addresses, contained in the instruction stream, are loaded into the instruction unit 20 by bus 41. These operands are transferred to the execution unit 21 for loading to registers by a 32-bit bus 43.

A clock generator 44 produces a four-phase output (phi-1 to phi-4) which establishes a machine cycle of four phases P1, P2, P3 and P4 as will be referred to. For an example, the clock rate is 25-MHz, producing a machine cycle of 40 ns.

Figure 2:
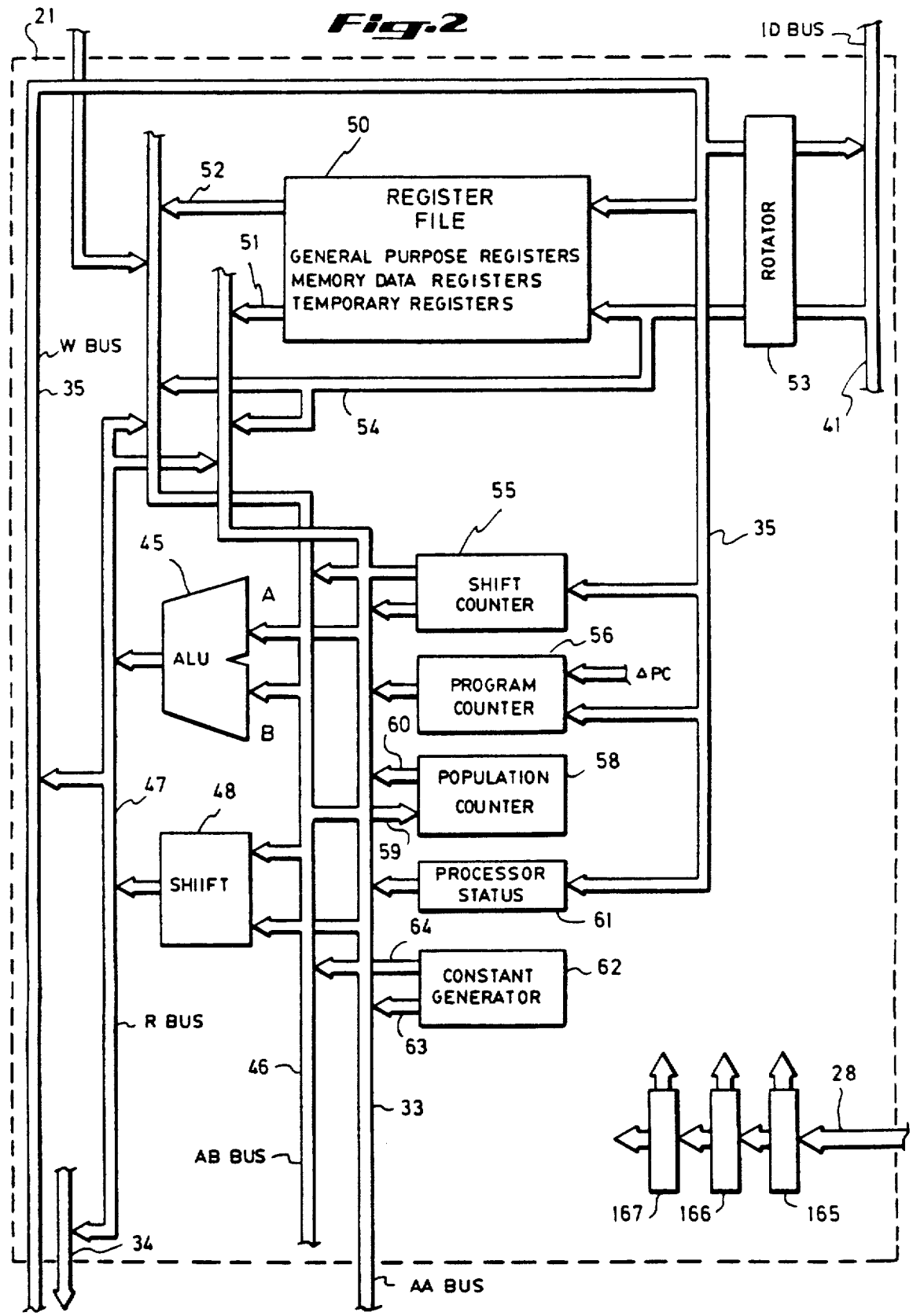
FIG. 2 is an electrical diagram in block form of the execution unit of the CPU of FIG. 1.

The Execution Unit:

Referring now to FIG. 2, the execution unit 21 is shown in more detail. This unit includes a 32-bit ALU 45 which has a 32-bit wide A-input from the AABus 33 and a 32-bit wide B-input from an ABBus 46. The ALU 45 performs the Add, Subtract, OR, etc., operations as needed to support the instruction set of the CPU, as defined by a field of the currently-used microinstruction from the bus 28. The output of the ALU is always to a result bus 47, and thus to the write bus 35. The only two sources of data to the result bus are the ALU and a barrel shifter 48, which is a 64-bit in, 32-bit out, shifter unit that implements shift operations of the instruction set. Zero to 32-bit right shifts and zero to 32-bit left shifts can be performed, under control of fields in the microinstructions sent via the bus 28. The data on the result bus 47 can be loaded to the AABus 33 or the ABBus 46 for bypass, or to the write bus 35, as well as to the ALU output bus 34 going to the memory management unit 30.

The write bus 35 can write to a register file 50, which is a set of forty-one 32-bit registers, including fifteen general purpose registers, eighteen temporary registers, and eight memory data registers; these registers contain operands and addresses currently being used, and writing to and reading from the register file is under control of fields of the current microinstruction, the only output of the register file being by 32-bit outputs 51 and 52 to the AABus 33 or ABBus 46. The internal data bus 41 can also write via rotator 53 to certain registers of the register file as determined by the microinstruction, and the internal data bus can also bypass the register file and write directly to the AABus and ABBus via input 54, as when data from the internal data bus is being written to a register file and is also being used as an ALU input in the same cycle.

A shift count register 55 provides a shift count for the shifter 48, and also functions to count cycles (as useful in multiply or divide). This counter 55 is a 32-bit register which may be loaded from the write data bus 35 or loaded to the AABus or ABBus under microinstruction control.

A 32-bit program counter or PC 56, containing an internal adder, is also part of the register set. The PC 56 contains the address of the instruction being executed. As an instruction (including opcode and operand specifier bytes, and specifier extensions) is parsed in the instruction unit 20, the PC 56 is updated to track the address by the delta-PC bits from the instruction unit on bus 38. The program counter may also be loaded from the write bus 35. The output 57 of the program counter 56 is to the AABus, from which the address passes through the ALU 45, and, ordinarily, to the memory management unit 30 via bus 34.

A counter circuit 58, referred to as the population counter, receives its input 59 from the ABBus 46 and produces an output 60 to the AABus 33; this circuit functions to count the number of bits set in a binary word loaded to the ABBus and to produce a binary value equal to this count of bits. The population counter 58 is used to count the number of bits in a save mask (a binary word, each set bit of which corresponds to a register that needs to be saved) where the binary value is used to determine the number of registers from the register file 50 or register set that must be saved in a procedure CALL, RETURN, Push-Register, or Pop-Register.

A processor status register 61 is also included in the set of registers of the execution unit 30. This status register contains the ALU condition bits, such as carry, overflow, zero and negative, as well as various other status bits such as interrupt priority level, trace pending, etc. The status register can be read onto the AABus 33, or written via the write bus 35, under microinstruction control.

A constant generator 62 produces constants for loading to the AABus or ABBus via outputs 63 and 64. The microinstruction can contain an 8-bit constant in a field of the bus 28 (a "microinstruction literal"), and this byte can be loaded to the ABBus by the constant generator 62 at any of the four byte positions of the 32-bit word width as determined by another 2-bit field of the current microinstruction. Also the generator can produce a constant of 1, 2, 4 or 8 in response to the value of the data-length DL control bits on lines 38, and this constant, representing the number of bytes in the operand to be handled, is loaded to the ABBus 46 via output 64. The constant generator is also used along with the shifter for sign-extending data.

The rotator 53 is the I/O interface between the execution unit 21 and the internal data bus 41, and functions to align the data on longword boundaries when loaded to the registers or bus of the execution unit, or to restore the data going from the execution unit 21 to memory to the intended byte positions. The two least significant bits of the address, and data length (DL control bits on bus 38), are used by the rotator 53 to make these transitions.

Figure 3:
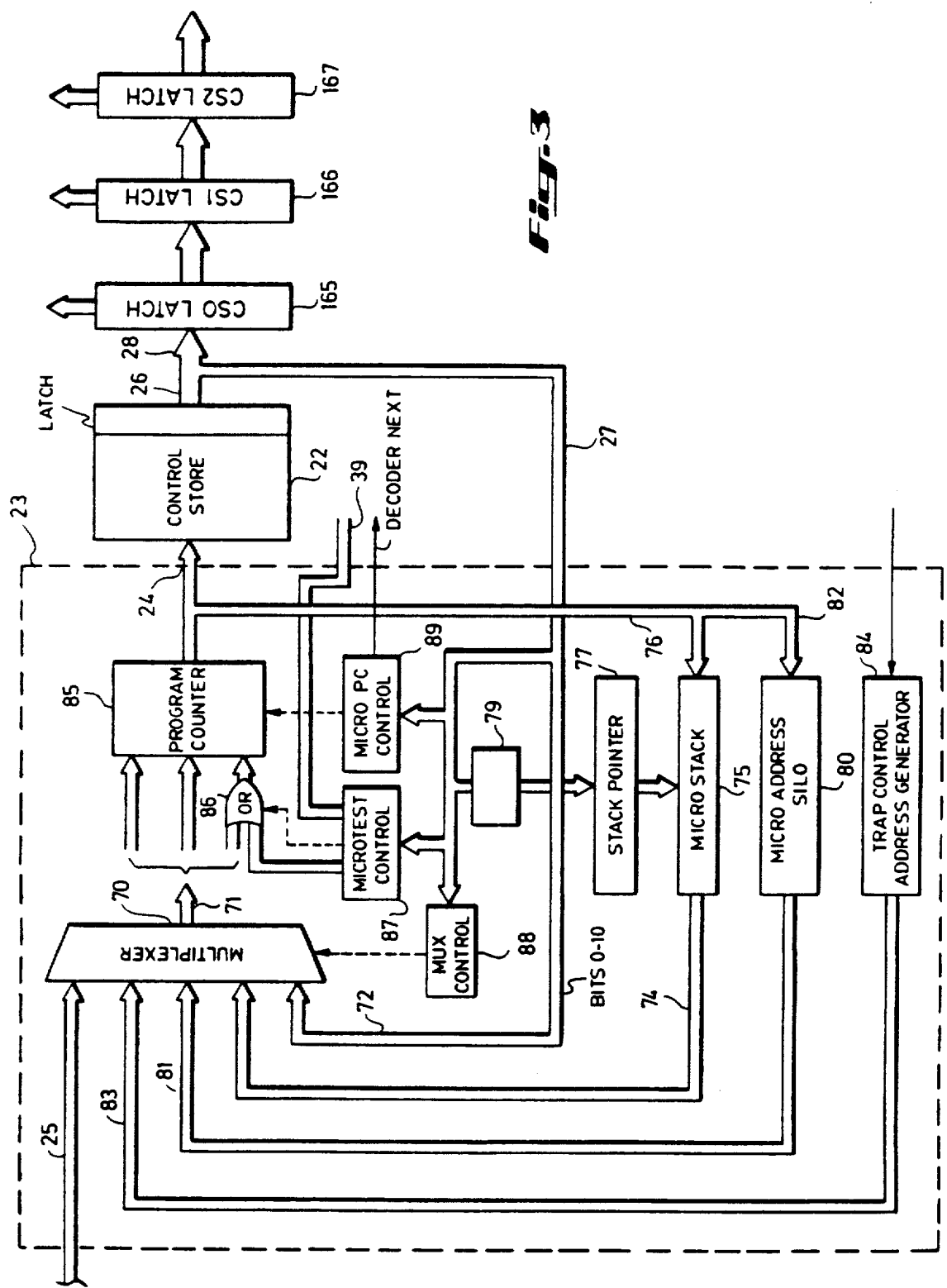
FIG. 3 is an electrical diagram in block form of the microsequencer of the CPU of FIG. 1.

The Microsequencer:

Referring now to FIG. 3, the microsequencer 23 is shown in more detail. The microsequencer produces an 11-bit address to the control store 22 in every machine cycle, and at the beginning of the next cycle the control store 22 produces a 50-bit latched output on bus 26, sixteen bits of which are fed back into the microsequencer for address and control by bus 27. These sixteen bits include an address for the next microinstruction, along with control information. FIG. 4 shows the format of the 16-bit data on the bus 27, where the two types of address and control information are seen to be a jump and a branch. The jump includes an 11-bit jump address, bits 0-10, and a 3-bit mux-control field, bits 12-14, while bit-15 is always "0" for a jump (and always "1" for a branch). Bit-11 is for microsubroutine control, for either type. The branch format includes a 7-bit offset, bits 0-6, and a 4-bit branch condition selector field.

The mux-control field is used in the microsequencer 20 of FIG. 3 to control a multiplexer 70 to produce one microaddress output 71 from a number of inputs; one input 72 to the multiplexer 70 is the jump address field, bits 0-10 from the bus 27, and of course another is the dispatch address 25 from the instruction unit 20. If the microinstruction on the output 26 is the last one of routine or microflow, a "decoder-next" output is asserted to cause the I-Box 20 to produce a new dispatch.

A third input to the multiplexer 70 is an output 74 (a stack read bus) from a register stack 75. The microaddress stack 75 is a push-down stack for storing up to eight of the 11-bit addresses appearing on the bus 24 and thus appearing on an input write bus 76 for the stack. A stack pointer 77 points to the TOS or top-of-stack, and this pointer is incremented or decremented for PUSH or POP stack operations by controls from the bits 11-15 of the control information on the bus 27, as connected via bus 78 to stack control decoder 79. If a CALL is decoded, the 11-bit address on input 76 is PUSHed to the stack 75, or if a RETURN is decoded the TOS is selected as the input to the multiplexer 70, and the stack is POPed by decrementing the pointer 77.

A microaddress silo 80 provides another input 81 to the multiplexer 70. This silo is a FIFO memory having three registers, storing the three last-used 11-bit addresses from the address bus 24, via input 82. This silo is constructed as a shift register which is clocked forward by each machine cycle, except when a stall or a trap is signalled, in which case the three addresses in the silo are saved until a trap ends, when the last three addresses may be used by jumping to a recover micro-routine, which will use the silo input 81 by the proper code to the multiplexer via bus 78.

The other input to the multiplexer 70 is an output 83 from a trap control address generator 84. A number of different types of trap microroutines, and thus addresses for starting these microroutines, are available.

A branch address, specified when bit-15 on bus 78 is a "1", is made up of three parts, assembled in the microprogram counter 85. Bits 7-10 of the 11-bit branch address are copied from the current microinstruction (i.e., the one currently already in the counter 85), and bits 0 and 4-6 are copied from the microinstruction by the input 72, while bits 1-3 are the logical OR, via gate 86, of the microinstruction on input 72 and the contents of the 3-bit microtest bus 39. That is, "Branch" type microinstructions (microbranch instructions) are detected on the microinstruction bus 28 by the microtest control logic 87. Upon detecting a microbranch instruction, the control logic 87 forwards conditions present on the microtest bus 39 to the OR gate 86, and, at the same time, MUX control logic 88 also detects a microbranch instruction on the microinstruction bus 27, and causes the microprogram counter 85 to compute a branch destination address based on the OR-ing of the conditions on the microbranch bus 173 and selected bits from the microbranch instruction provided as input to the multiplexer 70.

Also seen in FIG. 4 is the format of the microinstruction word, particularly the 34-bit part appearing on the bus 28 at the output of the control store. Four general types of microinstructions are used, these being referred to as Basic, Constant, Shift and Special. For each of these, bits 16-33 are the same and include a 6-bit "A" field (bits 16-21) which selects the source of the AABus 33 in the execution unit, and a 6-bit "W" field (bits 28-33) to select the destination, i.e., where the write bus 35 is written, such as one of the registers in the register file 50. Bit-27 is a condition code control for the processor status register 61. The miscellaneous field, bits 22-26 is decoded to define the particular operation to be performed. The Basic, Shift and Special types all have a "B" field (bits 34-37) which selects the source of data on the ABBus 46, i.e., the ALU B input. The Shift type has fields (bits 38-46) which define the shift function to be performed in the shifter 48 and the shift value (number of bits from zero to 32-bits). The Constant type of microinstruction format includes a constant value (bits 34-41) for a microinstruction literal operation, to be loaded to AABus via constant generator 62, and a position field (bits 42-43) for defining constant position. The function to be performed by the ALU 45 (e.g., Add, Subtract, AND, Pass, etc.) is defined by bits 44-48 of the Basic format or bits 44-46 of the Constant format. The bit-38 of Basic is a data word length control, and bits 39-43 define the memory request function.

Figure 5:
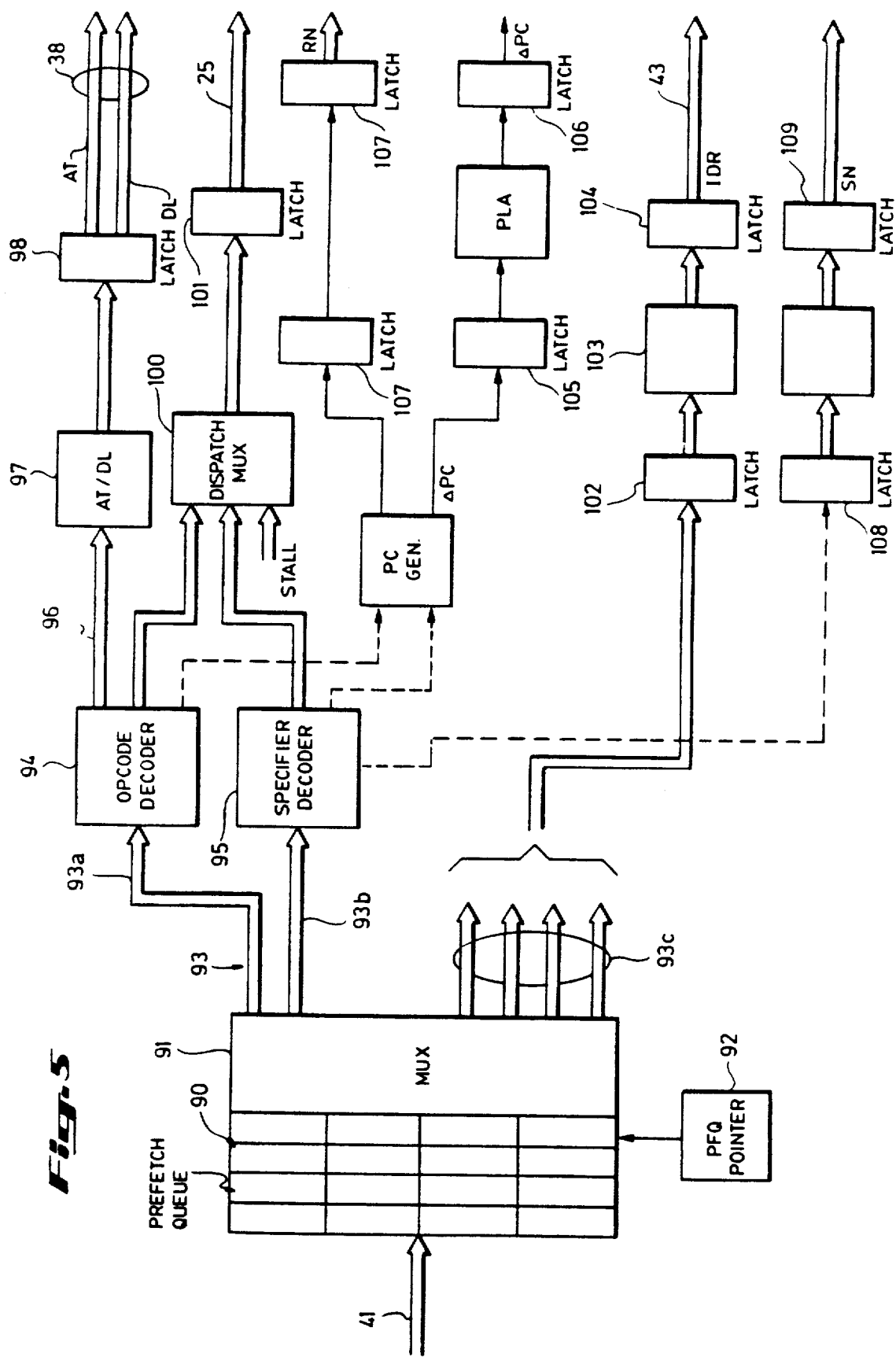
FIG. 5 is an electrical diagram in block form of the instruction unit of the CPU of FIG. 1.

The Instruction Unit:

In FIG. 5, the internal construction of the instruction unit 20 is illustrated. Instructions are loaded from internal data bus 41 into a prefetch queue 90, which is a FIFO constructed as a set of high-speed registers holding four 32-bit longwords (four four-byte instruction and operand words). Since the instructions are of variable length, having a variable number of operands and specifiers following an opcode of one or two bytes, and might not be aligned on word boundaries, the prefetch queue 90 functions to allow the information needed to begin parsing and decoding the next instruction or operand to be immediately accessible. The prefetch queue is capable of shifting up to two longwords in a machine cycle; instruction stream data is supplied to the input of the prefetch queue 90 whenever the queue is not full and no other system process requires the data path. A prefetch multiplexer 91 receives 4-bit address information from a prefetch pointer 92 to produce at an output 93 six bytes from the prefetch queue 90 which represent the next six valid bytes starting with an opcode; the opcode might not be on a longword boundary, so the output 93 includes an opcode byte 93a, a specifier byte 93b, and four bytes 93c of specifier extension field selected from queue 90 by the multiplexer 91 beginning at any of the byte positions of the queue. Two of these six bytes are connected to a set of decoders or PLA's including an opcode decoder 94 and a specifier decoder 95.

Based upon the opcode byte on output 93a, the decoder 94 produces on output 96 several sets of access type and data length control bits (referred to as AT/DL controls), one set for each operand to be used for this instruction. A multiplexer 97, receives this output 96 and selects one set for each operand as it is being defined. The output of multiplier 97 is held in a latch 98, from which the AT/DL part of the control bus 38 going to the execution unit 21 is obtained.

A dispatch multiplexer 100 selects whether the dispatch address 25 to be sent to the microsequencer 23 is an execution dispatch from the instruction decoder 94, a specifier dispatch from the specifier byte decoder 95, or a stall dispatch. A stall dispatch is produced whenever there are insufficient bytes in the prefetch queue 90 to define an execution or specifier dispatch. This stall dispatch merely forces a dispatch address to the microsequencer 23 to address a microinstruction which does nothing but issue a "decoder next" request back to the I-Box, thus a do-nothing cycle is introduced to allow the I-Box to fill the PFQ. The 11-bit address output from this multiplexer 100 is latched into a dispatch address latch 101, so it can be available for siloing. The specifier extension data, up to four bytes on the outputs 93c from the queue 90, is applied to a latch 102, from which it passes though a formatter 103 which sign-extends and right-justifies any specifier extension data that may exist, then to another latch 104 from which this data is connected by 32-bit bus 43 to the execution unit 21.

Also, the I-Box produces a delta-PC value in latch 105, which represents the amount the program counter 56 should be incremented in order for the E-Box PC 56 to point to the next opcode or specifier, this being based upon the number of bytes in the opcode and specifiers currently being processed. The delta-PC value in latch 105 is transformed by a PLA then loaded to a latch 106 to be available in the next machine cycle for use by the E-Box via bus 38. In addition, the I-Box produces a 4-bit RN field in latches 107, which specifies one of the sixteen general purpose registers in register file 50 that is to be used for the current specifier or execution microflow. This RN field is derived from the register field of a specifier byte. Further, a 3-bit SN field is produced in a latch 108 to specify the memory data register in the register file 50 that should be used to store the result of the current specifier flow. The value in the latch 108 is transformed in a PLA and loaded to latch 109 in the second cycle, ready for use by the E-Box in the third cycle via bus 38.

Figure 6:
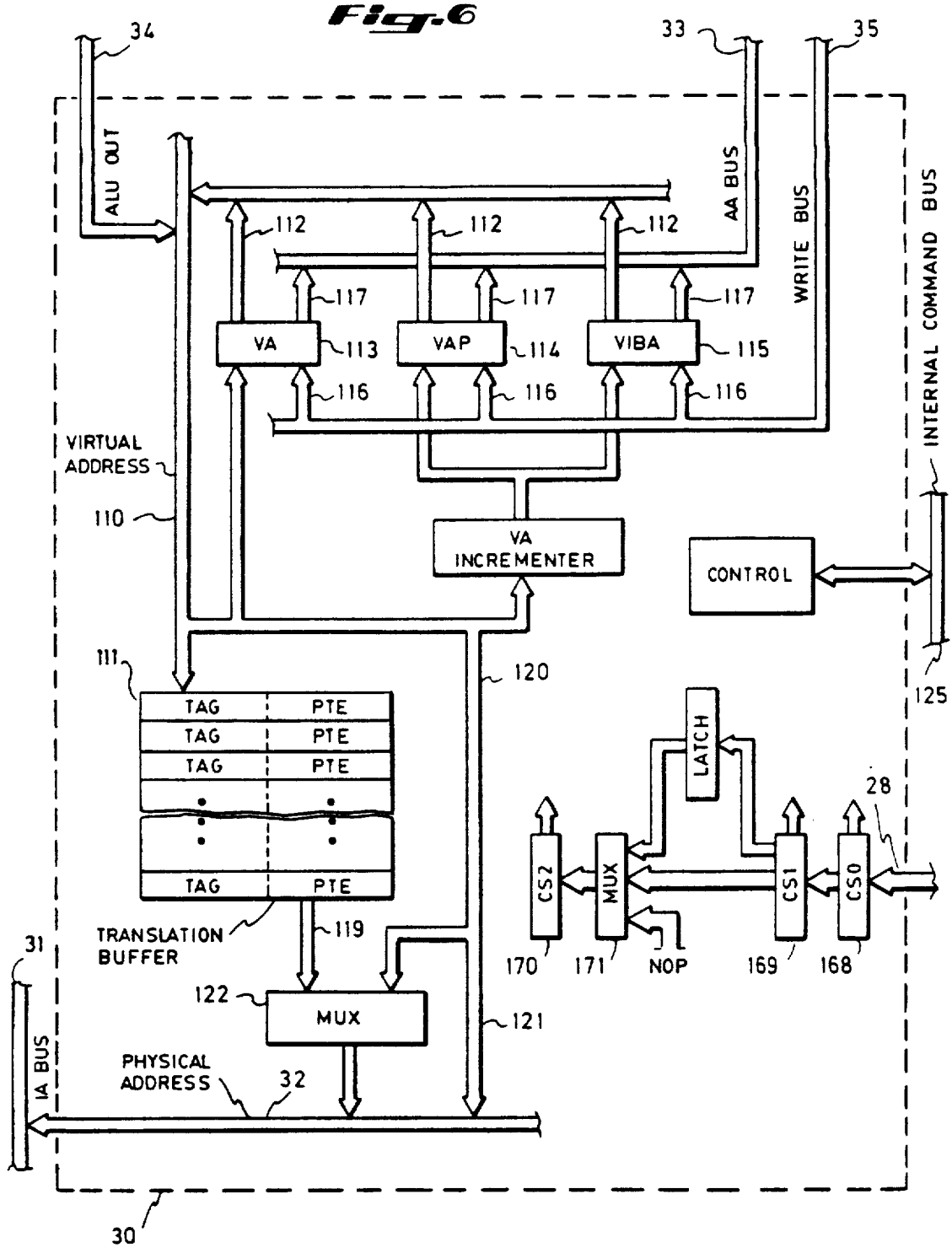
FIG. 6 is an electrical diagram of the memory management unit of the CPU of FIG. 1.

The Memory Management Unit:

The memory management unit 30 is seen in detail in FIG. 6. Any address for instruction or data read or write appears on a 32-bit virtual address bus 110, and this virtual address is used in a translation buffer 111 to generate a physical or real address which appears on the bus 32 going to the internal address bus 31. The virtual address may be generated at the output of the ALU 45 in the execution unit 21 and applied by the ALU output bus 34 to the virtual address bus 110, or it may be loaded to the bus 110 via outputs 112 from three registers, these being a virtual address register 113, a virtual address prime (VAP) register 114, and a virtual instruction buffer address (VIBA) register 115. The three registers 113, 114 and 115 allow many addresses to be generated without using the main data paths and ALU of the execution unit 21. Each of these registers can be written from the write bus 35 via inputs 116, or read via outputs 117 and the AABus 33, under control of the W and A fields of the microinstruction. The VA register 113 provides the address for write operations, and it also latches the virtual address from the bus 110 for every memory request, so if a memory management exception occurs, a microinstruction can always access the faulting address in the VA register 113. The VAP register 114 always latches the VA bus 110 plus four, so it contains the address of the next sequential longword; this register is used by microinstructions to access multiple longwords, and also to access the second longword of unaligned memory references, i.e., a memory reference that requires a second reference to complete. The VIBA register 115 is loaded whenever a microinstruction performs a flush and load of the program counter 56; the VIBA register is then used to prefetch longwords of instruction stream data from memory for filling the prefetch queue 90, being incremented by four after every instruction stream longword fetch. An incrementor functions to increment the registers 114 and 115 by four.

The translation buffer 111 is a fully associative memory containing sixty-four locations, each location containing a tag of a recent successful translation along with the page table entry (PTE) for this tag. The page address (bits 9–31) of each virtual address received from the bus 110 by the translation buffer is compared to the 23-bit tag of all sixty-four entries, and if a match occurs the PTE corresponding to the matched tag is output on bus 119 (21-bits). The lower thirty bits of the virtual address bus 110 appear on a bus 120, from which bits 0-8 are applied directly to the internal address bus 32 via lines 121 and constitute the byte address within a page; the twenty-one bits 9-29 from the VA bus 110, via bus 120, are one input to a multiplexer 122 and the 21-bit PTE from the translation buffer are the other input via bus 119, so the upper 21-bit part of the address applied to the internal address bus 31 via bus 32 is thus either directly from the VA bus or translated via the buffer 111 and the PTE. That is, by microinstruction control, the address applied to the internal address bus 31 may be directly from the VA bus 110, or it maybe a translated address using the translation buffer 111.

If the page of the address on the VA bus 110 is not among the sixty-four tags in the buffer 111, and a translated address has been specified, then a fault condition is signalled, this being a TB fault. The microsequencer 23 produces the starting address for a routine that allows the page address to be looked up in a table maintained in memory 15 or cache by the operating system; this of course will require a number of microinstruction cycles to accomplish.

A controller within the unit 30, responsive to the microinstruction currently asserted for each segment of the unit 30 in the pipeline (as explained below), produces a command on the internal command bus 125 for defining the operation of the bus interface unit 42.

Figure 7:
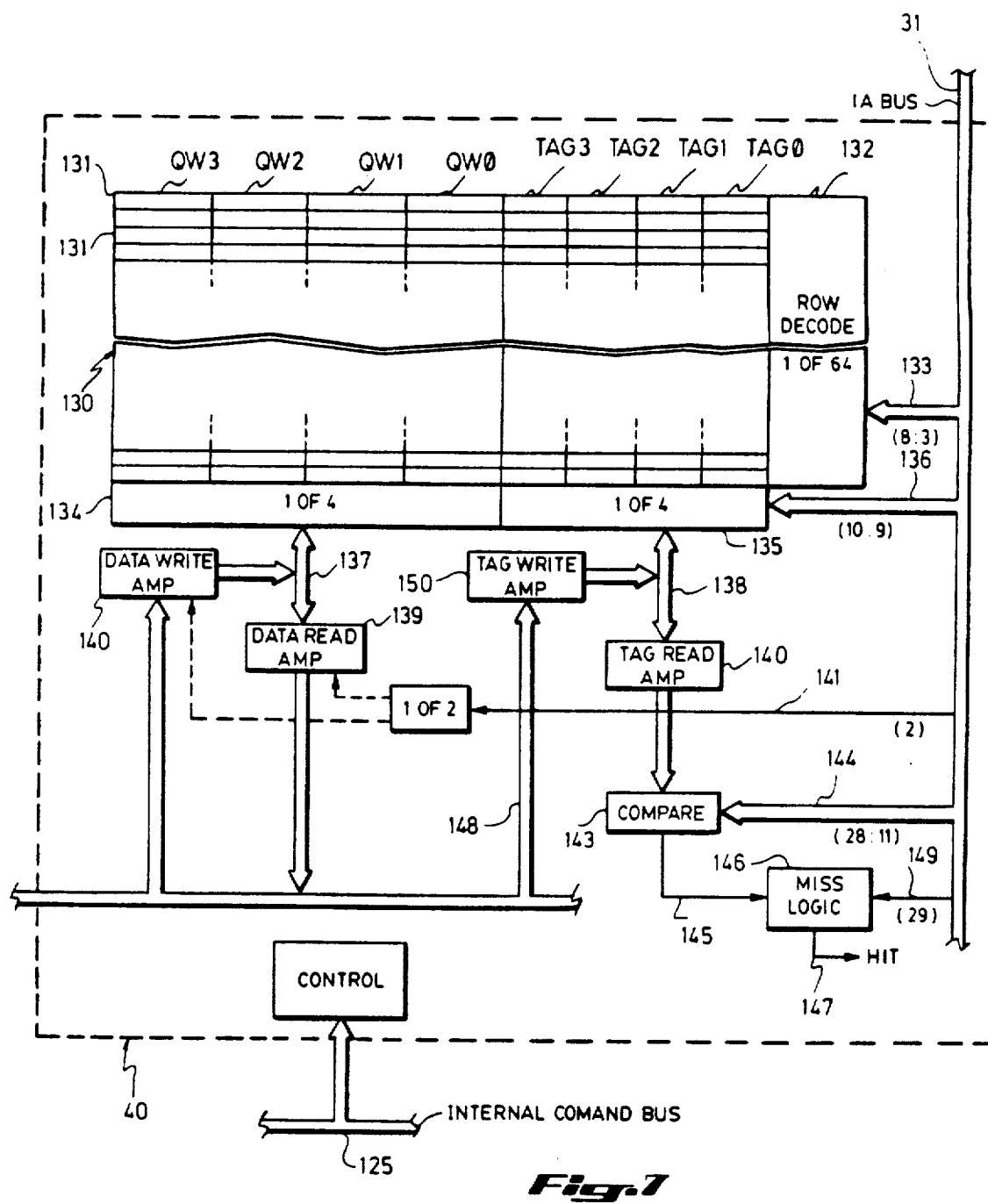
FIG. 7 is an electrical diagram in block form of the primary cache or P-cache memory of the CPU of FIG. 1.

The Primary Cache:

Referring now to FIG. 7, the primary cache or P-Cache 40 is shown in more detail. This cache contains a 2K-byte high-speed memory 130 which is addressed by the internal address bus 31 and which reads to or is written from the internal data bus 41. The memory 130 is organized as sixty-four rows with four quadwords QW0, QW1, QW2 and QW3 in each row, along with four corresponding tags Tag0, Tag1, Tag2 and Tag3, one for each quadword. A row decoder 132 selects 1-of-64 based upon six bits 3-8 on lines 133 from the internal address bus 31. The row selected will be loaded to a column decoder 134 for the data and a column decoder 135 for the tags, where a 1-of-4 selection is made based upon two bits 9-10 on lines 136 from the IA bus 31. In this manner, one tag (19-bits) and one quadword (64-bits or eight bytes) are selected at data and tag I/O busses 137 and 138 within the P-Cache. The data bus 137 is read by sense amplifiers 139, or written by write amplifiers 140, where another 1-of-2 selection is made based upon bit-2 on line 141 from the IA bus 31, so that a selected 32-bits or four bytes are loaded to or transferred from the internal data bus 41, if there is a tag hit. The tag read from the selected location in cache memory 130 is compared in a comparator 143 to the eighteen bits 11-28 from the IA bus 31 via lines 144. If all bits are the same, a hit is signalled on line 145, from which miss logic 146 produces a P-Cache hit output on line 147 if bit-29 of IA bus 31 via line 149 does not indicate that the reference is to I/O space, since I/O references are never cached. A write amplifier 150 is also provided for the tag I/O bus 138 for loading the tags when the cache 130 is filled.

The Bus Interface Unit:

Referring to FIG. 8, the bus interface unit 42 drives the 27-bit system address bus 12 based upon the 30-bit physical address on the internal address bus 31; the difference is because the 30-bit address on the bus 31 is a byte address and the 27-bit address on the bus 12 is aligned for quadwords (eight bytes), corresponding to the quadword (64-bit) width of the system data bus 11. To allow this transition, and to allow various data lengths, aligned or non-aligned, the control bus 13 contains an 8-bit byte mask field which includes a bit for each of the eight possible byte positions, and a controller 155 in the bus interface generates an 8-bit byte mask for applying to the system control bus based upon an internal 4-bit byte mask generated in the memory management unit and connected to the bus interface by lines 156. The memory management unit uses the data length DL control bits on lines 36, originating in the decode of opcode and operand specifiers in I-Box 20 via bus 38, and of course the low-order bits 0-2 of the address on bus 31 defines the starting byte address. In this manner, transition is made between the 32-bit internal data bus 41 and 64-bit system data bus, and between the 30-bit internal address bus and the 27-bit system address bus.

The system control bus 13 also contains a 4-bit bus command, which is driven by or received by the controller 155 of the bus interface unit 42. This bus command defines what operation is occurring on the system busses, i.e., the CPU 10 reading instruction stream quadwords from memory 15, the CPU 10 reading data stream quadwords, the CPU 10 writing to memory 15, etc. This 4-bit command is asserted along with an address strobe which is another of the lines of the control bus 13, which also includes lines for Ready, Read, DMA Request, Interrupt, Halt, as well as coprocessor controls, as may be needed for implementing a complete system.

Data and addresses, and bus commands, are transferred in and out by an in-latch 158 and a dual out-latch 159, each of which contains a 64-bit data register 160, a 27-bit address register 161, and a bus command register 162. In this manner, the in-latch 158 can receive a 64-bit quadword from bus 11 in one cycle and transfer two 32-bit longwords to the internal bus 41 in two cycles. Likewise, each out-latch 159 can load two 32-bit longwords in two cycles then a 64-bit quadword can be transferred to the system bus 11 in one cycle. The reason for having two identical out-latches is to speed up CPU 10 writes to memory, since the memory write operation on the external busses 11, 12, 13 takes three cycles; with two out-latches the second can be loading while the first is being written to memory 15 via the system data bus 11.

A memory read transaction is implemented by the bus interface unit 42 when the internal command bus 125 indicates a memory read, as signalled from the memory management unit 30, occurring when the memory management unit is requesting data specified by the physical address driven onto the internal address bus 31. If this address is found in the primary cache 40 tag store, the cache 40 drives the internal data bus 41 with the data and the intended receiver (I-Box 20 or E-Box 21) latches the data from the data bus 41. If the tag misses in the tag compare 143 of the primary cache, the tag hit signal on line 147 is de-asserted, and the read command on lines 125 and the physical address on bus 31 are loaded into the out-latch 159, and the controller 155 takes over and services this read request whenever the system busses are available in the next few cycles; no further commands from the M-Box 30 will be serviced until the requested data has been received and latched into in-latch 158. The unit 42 drives the data from the in-latch onto the bus 41 and thus to the intended destination, the I-Box, the E-Box or P-Cache. As an example, if the primary cache misses, and the data must be fetched from main memory 15, the read transaction may take six machine cycles, during which the pipeline of the CPU is stalled.

A memory write sequence begins with a write command being asserted on the internal command bus 125 by the M-Box, at which time the M-Box also drives the internal byte mask onto lines 156. Because the cache 40 is of the "write-through" type, all memory writes are "tried" in the cache and executed in main memory. Thus when a write command is on the internal command bus 125, the P-Cache 40 compares the address on the bus 31 to its tag array. If the reference hits, the data then on the ID bus 41 is written into the cache RAM 130. If the tag compare misses, the data is ignored by the P-Cache. In either case, the data on the IA bus 31, the ID bus 41, the internal command bus 125 and the byte mask, are all loaded into the out-latch so that an external write sequence can write to main memory (and a backup cache if used).

Pipelining:

The CPU 10 of FIGS. 1-8 is highly pipelined; events in the execution of an instruction are spread over many machine cycles, and execution of parts of a number of instructions are overlapped, i.e., occurring at the same time. The CPU uses a five-segment pipeline, as illustrated in a general sense in FIG. 9, where an instruction I1 is seen to begin its execution in segment s1 during cycle 1, and continue through segment s5 in cycle 5. Instruction I2 begins execution in segment s1 in cycle 2, when instruction I1 is in segment s2, and likewise continues through to segment s5 in cycle 6. In cycle 5 and thereafter, there are parts of five different instructions executing in parallel in the five segments of the pipeline. Of course, FIG. 9 is an idealistic situation, where it is assumed that every instruction executes in exactly five segments, and there are no stalls or exceptions; in this ideal case the average execution rate would be one instruction per machine cycle.

The actual events occurring in the five segments of the pipelining in the CPU 10 of FIGS. 1–8 are more fully shown in FIG. 10. First, it will be noted with reference to FIG. 11 that the CPU 10 is clocked by the clock generator 44 to provide four phases P1, P2, P3, and P4, of equal length, in each machine cycle. These clock phases are used to drive the CMOS circuitry used to construct the CPU 10, in the example embodiment.

In segment-1 of FIG. 10, if the instruction unit 20 has a valid instruction and operand specifier present in the prefetch queue 90 during phase P1, then this information is decoded in the decoders 94 and 95 during P2 and P3, so that the output of the dispatch multiplexer 100 is available in P4 and the latch 101 is loaded with the dispatch address. Latch 102 is loaded in P4 with parsed specifier extensions, which are part of the instruction stream data.

In segment-2, the dispatch address is driven onto bus 25 during P1, and the control store 22 is accessed during P2 and P3. The microinstruction is available at the output 26 during P4 of this segment, ready for loading to the first level of controlled elements of the execution unit in P1 of the next cycle. Also in this segment-2, the specifier extensions, if any, are formatted in going from latch 102 through the formatter 103 to latch 104, and the data such as Sn and Rn is calculated and latched, and the AT/DL information is latched, so this data and control information will be available for the execution unit 21 via bus 38 at the beginning of the next cycle.

In segment-3 of the pipeline, also referred to as the CS0 segment, the execution unit 21 accesses the various registers or busses and places the data to be operated upon on the AABus 33 and ABBus 46, based upon the A and B control fields of the microinstruction available in a 34-bit CS0 latch 165, where it has been loaded via bus 28. The register file 50, the internal data bus 41, the immediate data bus 43, are all sources for the operands to be loaded to AABus and ABBus in this segment, as well as the remainder of the register set, including the program counter 56, the address registers 113, 114 and 115 in the memory management unit 30, etc.; all of these are set up to be available for read in P4 of this cycle. Also, the execution unit accepts the control bits on bus 38 during P1 of this segment.

In segment-4, also called the CS1 segment, the operation specified by the ALU Function part of the microinstruction, if it is a Basic or a Constant type as seen in FIG. 4, is performed in the ALU 45, or, if the microinstruction is a Shift, the operation specified by the Shift Function and Shift Value fields of the microinstruction is performed in the shifter 48. Since the control store 22 will be producing a new microinstruction during every cycle, it is necessary to have stored the microinstruction from the last cycle when the same microinstruction was used in segment-3; to this end, the microinstruction output 28 available from the control store is latched in the CS0 latch 165 and the output of this latch is used for the operations performed in segment-3, then is latched at the end of the cycle into another CS1 latch 166 as seen in FIG. 3 so that the microinstruction is available for the execution unit 21 in segment-4. Again, the output of this latch 166 is stored in a similar CS2 latch 167 at the end of segment-4 (fourth clock cycle for this instruction) for use in segment-5.

The operation of the memory management unit 30 occurs in parallel with the pipeline segments of the execution unit 21. The microinstruction from bus 28 is latched in segment-3 into a different CS0 latch 168 seen in FIG. 6, then into another CS1 latch 169 in segment-4, so the microinstruction Memory Request field seen in FIG. 4 will be available when needed. During P2 of the machine cycle of segment-4, the unit 30 sends a request to the bus interface unit 42 if the busses are going to be required. The unit 30 determines the address source defined by the microinstruction which is in the CS1 latch 169, among the possible sources of the ALU out bus 34, the VA register 113, etc, and the virtual address bus 110 has the selected address available during P4, and the translation buffer 111 makes the tag look-up. At the end of segment-4, the microinstruction is transferred from the CS1 latch 169 to the CS2 latch 170 through the multiplexer 171, if no delay is introduced by a fault or exception.

In segment-5, the write bus 35 is driven by the ALU 45 or shifter 48 output in the execution unit 21, and writes to the destination defined by the W field of the microinstruction in CS2 latch 167. The possible destinations include a selected register in the register file 50 or the other ones of the register set, the internal data bus 41 via the rotator 53, the AABus or ABBus for bypass, or the virtual address bus 110 in the memory management unit. During P1 of segment-5, within the memory management unit 30, the PTE is read to bus 119 and onto the internal address bus 31 via bus 32 if the translation buffer 111 has found a match. The row decoder in the primary cache 40 receives the address from IA bus 31 during P2 and accesses the data and the tag by the end of P2, then the tag comparator 143 does the tag compare in P3; if there is a match then data is available on the internal data bus 41 at the end of P3 if a read is being performed or is written to cache memory 130 in P4 if it is a write. If there is no tag match, then a miss is signalled in P3 on line 147. In the memory management unit, if the translation buffer 111 does not detect a tag match, then a exception is determined by P2 of segment-5 and signalled so that a routine to look up the page number for generating a physical address can be implemented.

Figure 12:
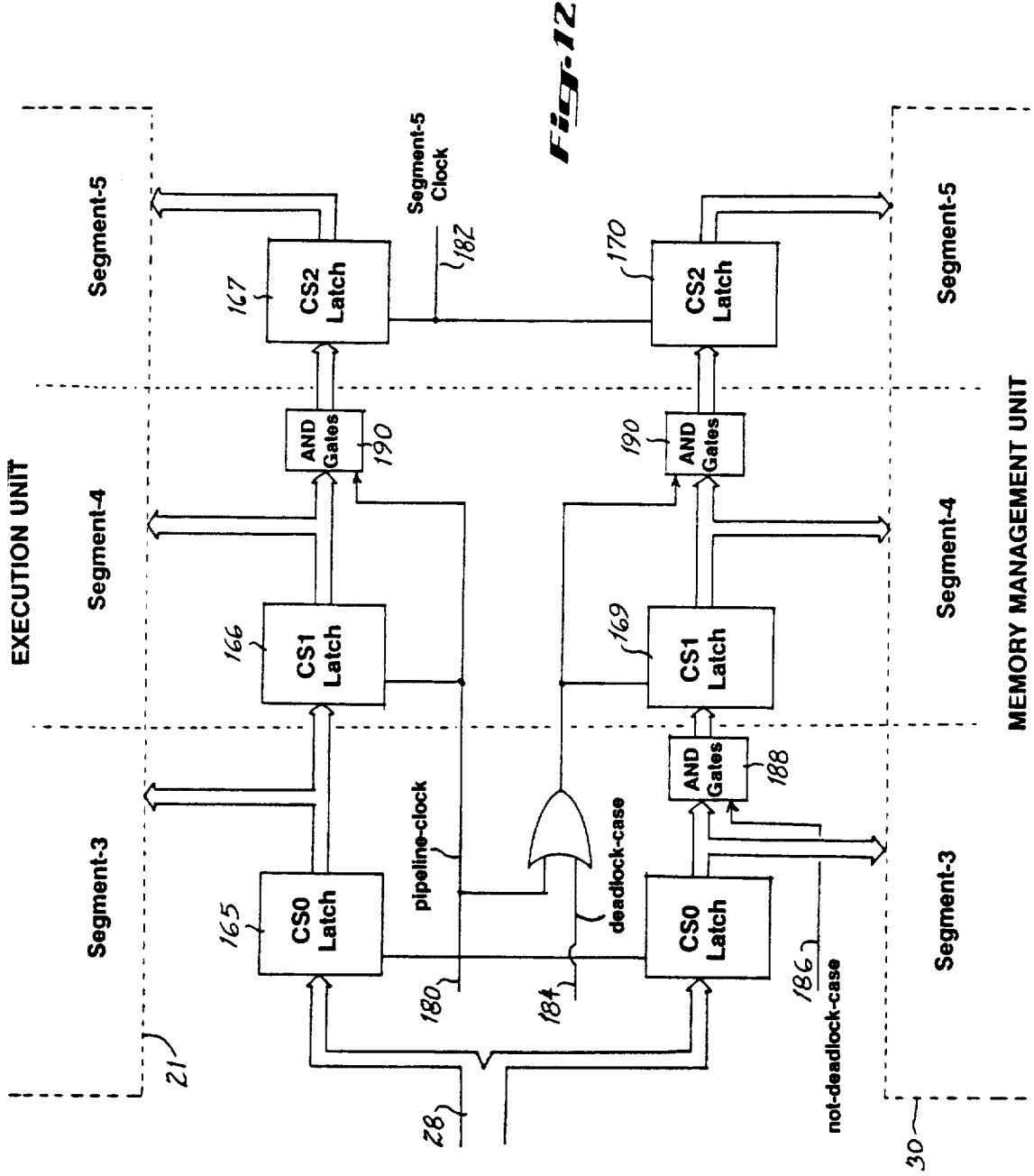
FIG. 12 is an electrical diagram in block form of the dual microinstruction pipeline that controls segment-3, segment-4, and segment-5 of the pipeline in the CPU of FIG. 1.

Dual microinstruction pipeline:

Referring to FIG. 12, the CS0 (165,168), CS1 (166,169) and CS2 (167,170) latches that were mentioned above with reference to FIGS. 2, 3 and 6 are shown. Each of the CS0 latches feeds a CS1 latch which in turn feeds a CS2 latch. This kind of sequential connection of latches allows the microinstruction bits to enter in one end and sequentially flow through the latches in consecutive machine cycles. In this case, microinstructions enter in CS0 and are used from each latch to control different activities in the execution and memory management units in consecutive cycles. These different latches thus allow overlapped instruction execution during each cycle.

The two sets of CS0 (165,168), CS1 (166,169) and CS2 (167,170) latches form a dual micro-pipeline which controls segment-3, segment-4, and segment-5 of the CPU pipeline. Each segment contains a part of the execution unit and a part of the memory management unit. One branch of the dual micro-pipeline, an execution unit control pipeline, controls the activity in the execution unit 21, and the other branch, a memory request pipeline, controls the activity in the memory management unit 30.

A pipeline-clock 180 causes the latches CS0 and CS1 of both branches of the dual micro to load the control information present at their inputs, thus advancing to segment-3 and to segment-4 of the CPU pipeline. If a stall condition is detected, the pipeline-clock signal is not asserted and the dual micro-pipeline branches don't advance. Segment-5 clock on the line 182 is an unconditional clock signal that causes segment-5 to advance every cycle. If the hardware detects a deadlock, a deadlock-case signal on line 184 is asserted. Not-deadlock-case 186 is the inverted value of deadlock-case. The AND gates 188 prevent the output of latch 168 to go to latch 169 when not-deadlock-case on line 186 is asserted. The AND gates 190 do the same thing between latches 169 and 170. The AND gates 190 are controlled by the deadlock-case signal ORed with the pipeline-clock signal.

Under normal flow, the pipeline-clock signal on line 182 is asserted every cycle and each CS0 latch (165,168) loads a part of a new microinstruction from the control store 22 via bus 28. This microinstruction ripples through the respective CS1 (166,169) and CS2 (167,170) latches in each branch of the dual microinstruction pipeline. The two branches carry different parts of the same microinstruction and they move in lock-step.

If a stall condition is detected and there is no deadlock, both the pipeline-clock signal on line 180 and the deadlock-case signal on line 184 are deasserted and neither pipeline is advanced. Note that the AND gates 190 are disabled, which causes a no-op (no operation) to be inserted in segment-5 of the dual micro-pipeline during stalls.

Special hardware detects if an operand required by the microinstruction in segment-3 is to be provided by a microinstruction which is currently in segment-4. It then asserts the deadlock-case signal on line 184.

If a stall condition is detected and a deadlock also exists, the pipeline-clock signal on line 180 is deasserted and the deadlock-case signal on line 184 is asserted. In this situation, the execution unit control branch of the dual pipeline acts in the same way as it did in the previous case, that is, it does not advance. However, the assertion of the deadlock-case signal on line 184 allows the memory request branch of the pipeline to advance from segment-4 on, forcing a no-op into segment-4. This allows the memory request for an operand to advance to the primary cache 40 and break the deadlock. The two branches of the dual microinstruction pipeline continue to advance in lock-step again.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A processor comprising:
   (a) a plurality of execution stages connected in sequence and a plurality of memory access stages connected in sequence;
   (b) microinstruction means for producing microinstructions for controlling the operation of said execution and memory access stages;
   (c) a plurality of latches receiving output from said microinstruction means, said plurality of latches temporarily storing controls representing said microinstructions, a respective one of said plurality of latches being associated separately with each one of said stages, said controls being separately coupled from each of said latches to each one of said stages;
   (d) means for advancing said controls through said plurality of latches for execution stages, and separate means for advancing said controls through said plurality of latches for said memory access stages, said separate means including means for applying said controls to a last one of said plurality of latches for said memory access stages under a selected condition whereby said memory access stages can complete a memory access operation even if said execution stages are stalled.

2. A processor according to claim 1 wherein said microinstruction means includes a control store, and said microinstructions include sets of control bits read from said control store, and said controls stored in said latches are derived from said sets of control bits of said microinstructions.

3. A processor according to claim 1 wherein said means for advancing for said execution stages and said means for advancing for said memory access stages both include clocking means.

4. A processor according to claim 3 wherein said clocking means includes conditional clocking means and unconditional clocking means.

5. A processor according to claim 4 wherein said conditional clocking means are in early ones of said stages and said unconditional clocking means are in later ones of said stages.

6. A processor comprising:
   (a) a plurality of first type stages connected in sequence and a plurality of second type stages connected in sequence, each of said first type stages performing processor execution functions and each of said second type stages performing memory access functions;
   (b) means for producing sets of control bits for controlling the operation of each of said first and second type stages;
   (c) a plurality of storage means for temporarily storing said sets of control bits, a respective one of said plurality of storage means being separately associated with each one of said first and second type stages;
   (d) first means for advancing said control bits through said plurality of storage means for said first type stages, and second means for advancing said control bits through said plurality of storage means for said second type stages, wherein said first and second means are separately controlled, said second means including means for applying said control bits to a last one of said plurality of storage means for said second type of stages under a selected condition of operation so that the second means can continue advancing while said first means and a first part of said second means are stalled.

7. A processor according to claim 6 wherein said first type stages are execution stages for selecting operands, performing functions on said operands, and storing the results of said operations.

8. A processor according to claim 7 wherein said second type stages are memory access stages for accessing memory locations for reading or writing operands or results to or from said execution stages.

9. A processor according to claim 6 wherein said means for producing sets of control bits includes a control store, and said sets of control bits are included in microinstructions read from said control store.

10. A processor according to claim 6 wherein said first and second type stages are pipelined stages and said storage means are latches for storing said control bits.

11. A method of operating a pipelined processor comprising the steps of:
 (a) advancing control or data sequentially through a plurality of first type stages, and separately and in parallel advancing control or data sequentially through a plurality of second type stages, each one of said first type stages performing execution functions and each of said second type stages performing memory access functions using said control or data;
 (b) producing sets of control bits for controlling the operation of said first and second type stages and temporarily storing in a plurality of separate storage means said sets of control bits, a respective one of said plurality of storage means being associated with each one of said stages, said sets of control bits being coupled from said separate storage means to each one of said stages to control the operation thereof;
 (c) advancing said control bits through said plurality of storage means for said first type stages, and separately advancing said control bits through said plurality of storage means for said second type stages, said step of separately advancing including applying said control bits to a last one of said plurality of storage means for said second type of stages under a selected condition of operation, whereby said control bits may advance in said storage means for said second type stages while stalled in said storage means for said first type stages and stalled in a first of said storage means for said second type stages.

12. A method according to claim 11 wherein said first type stages are execution stages for selecting operands, performing functions on said operands, and storing the results of said operations.

13. A method according to claim 13 wherein said second type stages are memory access stages for accessing memory locations for reading or writing operands or results to or from said execution stages.

14. A method according to claim 11 wherein said sets of control bits are microinstructions read from a control store.

15. A method according to claim 11 wherein said first and second type stages are pipelined stages and said storage means are latches for storing said control bits.

16. A pipelined processor comprising:
 (a) an execution unit having a plurality of sequentially-coupled execution stages including a first stage for accessing operands from local registers, a second stage for performing operations on said operands, and a third stage for storing results of said operations;
 (b) a memory interface unit having a plurality of sequentially-coupled memory-interface stages including a first stage for calculating memory requests, a second stage for evaluating memory availability, and a third stage for issuing memory addresses for memory access and receiving data from memory if available.
 (c) means for generating sets of control bits, one set for each cycle of operation of said processor, and
  (i) first means having an input connected to said means for generating and having outputs connected to said execution stages for applying at least some of each one of said sets of control bits to each of said first, second and third stages of said execution unit in successive ones of said machine cycles.
  (ii) second means having an input connected to said means for generating and having outputs connected to said memory-interface stages for applying at least some of each one of said sets of control bits to each of said first, second and third stages of said memory interface unit in successive ones of said machine cycles,
 (d) clocking means connected to said first and second means to advance said sets of control bits to said first, second and third stages of said execution unit and said memory interface unit in synchronization during normal operation of said processor and for stalling advance of said control bits to at least said first and second stages of said execution unit and said memory interface unit in a stall condition if a selected condition of operation occurs, said clocking means functioning to separately advance said sets of control bits for at least one of the stages of said memory interface unit during said stall condition if said selected condition of operation occurs.

17. A processor according to claim 16 wherein said clocking means unconditionally advances a set of control bits to said third stages even when said stall condition of operation exists.

18. A processor according to claim 17 wherein said clocking means causes a no-operation set of control bits to be inserted to said third stage of said execution unit during said stall condition of operation.

19. A processor according to claim 16 wherein said clocking means separately advances said set of control bits to said second stage of said memory interface unit during said stall condition of operation.

20. A processor according to claim 19 wherein separate advancing is done when there is a stall condition of operation and also a deadlock condition of operation.

* * * * *

UNITED STATES PATENT AND TRADEMARK OFFICE
CERTIFICATE OF CORRECTION

PATENT NO.   : 5,006,980
DATED        : April 9, 1991
INVENTOR(S)  : Douglas E. SANDERS et al.

It is certified that error appears in the above-identified patent and that said Letters Patent is hereby corrected as shown below:

Column 12, line 55, change "maybe" to --may be--.

Column 16, line 49, change "a" to --an--.

Column 18, line 16, after "for" insert --said--.

Column 19, line 56, change "13" to --11--.

Column 20, line 26, change "." to --,--.

Signed and Sealed this

Twelfth Day of November, 1991

Attest:

HARRY F. MANBECK, JR.

Attesting Officer           Commissioner of Patents and Trademarks